United States Patent
Na et al.

(10) Patent No.: US 10,293,308 B2
(45) Date of Patent: May 21, 2019

(54) ANTIFOULING AND ANTIMICROBIAL COATINGS FOR THIN FILM COMPOSITE MEMBRANES

(71) Applicant: International Business Machines Corporation, Armonk, NY (US)

(72) Inventors: Young-Hye Na, San Jose, CA (US); Ran Wang, Sunnyvale, CA (US); Andy T. Tek, San Jose, CA (US); Joseph Sly, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/134,867

(22) Filed: Sep. 18, 2018

(65) Prior Publication Data

US 2019/0015789 A1    Jan. 17, 2019

Related U.S. Application Data

(62) Division of application No. 14/788,405, filed on Jun. 30, 2015, now Pat. No. 10,086,338.

(51) Int. Cl.
| | |
|---|---|
| *B01D 67/00* | (2006.01) |
| *B01D 71/56* | (2006.01) |
| *B01D 71/06* | (2006.01) |
| *B01D 69/12* | (2006.01) |
| *B01D 71/52* | (2006.01) |

(Continued)

(52) U.S. Cl.
CPC ..... *B01D 67/0088* (2013.01); *B01D 67/0006* (2013.01); *B01D 69/12* (2013.01); *B01D 71/06* (2013.01); *B01D 71/56* (2013.01); *B01D 71/28* (2013.01); *B01D 71/40* (2013.01); *B01D 71/52* (2013.01); *B01D 2323/00* (2013.01); *B01D 2323/30* (2013.01); *B01D 2323/345* (2013.01);

(Continued)

(58) Field of Classification Search
CPC ............ B01D 67/0088; B01D 67/0006; B01D 71/06; B01D 71/56; B01D 69/12; B01D 2323/345; B01D 71/40; B01D 2323/30; B01D 71/52; B01D 71/28; B01D 2325/28; B01D 2325/48; B01D 2323/00
See application file for complete search history.

(56) References Cited

U.S. PATENT DOCUMENTS

| | | | | |
|---|---|---|---|---|
| 4,824,568 A | * | 4/1989 | Allegrezza, Jr. ....... | B01D 69/12 210/490 |
| 5,482,634 A | * | 1/1996 | Goerlach-Doht ....... | C08B 11/20 210/650 |

(Continued)

OTHER PUBLICATIONS

Rik T.C. Cleophas et al., "Characterization and Activity of an Immobilized Antimicrobial Peptide Containing Bactericidal PEG-Hydrogel," Biomacromolecules, Sep. 22, 2014, pp. 3390-3395.

(Continued)

*Primary Examiner* — Pamela H Weiss
(74) *Attorney, Agent, or Firm* — Shumaker & Sieffert, P.A.

(57) ABSTRACT

A coated, thin-film composite membrane includes a porous support and a polyamide barrier layer in contact with the porous support. A fouling-resistant and antimicrobial layer of star polymers is in contact with the polyamide barrier layer. The star polymers included hydrophilic arms of about 40 mol % to about 80 mol % of neutral hydrophilic moieties, and about 60 mol % to about 20 mol % of antimicrobial functional groups.

18 Claims, 6 Drawing Sheets

(51) Int. Cl.
*B01D 71/40* (2006.01)
*B01D 71/28* (2006.01)

(52) U.S. Cl.
CPC ...... *B01D 2325/28* (2013.01); *B01D 2325/48* (2013.01)

(56) References Cited

U.S. PATENT DOCUMENTS

| | | | |
|---|---|---|---|
| 7,368,564 | B2 | 5/2008 | Whiteford et al. |
| 7,432,371 | B2 | 10/2008 | Kriesel et al. |
| 8,505,743 | B2 | 8/2013 | Sarkar et al. |
| 8,765,098 | B2 | 7/2014 | Appel et al. |
| 9,782,727 | B2 | 10/2017 | Dubois et al. |
| 9,931,598 | B2 * | 4/2018 | Dubois ................. B01D 69/10 |
| 10,086,338 | B2 * | 10/2018 | Na ..................... B01D 67/0006 |
| 2004/0050791 | A1 * | 3/2004 | Herczeg ............... B01D 61/145 210/651 |
| 2007/0251883 | A1 * | 11/2007 | Niu ..................... B01D 61/025 210/653 |
| 2011/0182996 | A1 | 7/2011 | Fukushima et al. |
| 2011/0243848 | A1 * | 10/2011 | Appel ................ A61K 49/0036 424/9.1 |
| 2012/0048789 | A1 | 3/2012 | Shaw et al. |
| 2012/0048799 | A1 * | 3/2012 | Na ..................... B01D 69/125 210/490 |
| 2012/0241373 | A1 | 9/2012 | Na et al. |
| 2013/0001153 | A1 * | 1/2013 | Na ..................... B01D 69/125 210/488 |
| 2014/0048478 | A1 | 2/2014 | Bai et al. |
| 2014/0238939 | A1 | 8/2014 | Kasher et al. |
| 2014/0370064 | A1 | 12/2014 | Lee et al. |
| 2016/0236154 | A1 | 8/2016 | Dubois et al. |
| 2017/0001151 | A1 | 1/2017 | Na et al. |
| 2017/0361281 | A1 | 12/2017 | Dubois et al. |

OTHER PUBLICATIONS

Yi-Nig Wang et al., "Nanofiltration Membrane Fouling by Oppositely Charged Macromolecules: Investigation on Flux Behavior, Foulant Mass Deposition, and Solute Rejection," Environ. Sci. Technol. Sep. 19, 2011, pp. 8941-8947.

Felix Siedenbiedel et al., "Antimicrobial Polymers in Solution and on Surfaces: Overview and Functional Principles," Polymers, ISSN 2073-4360, Jan. 9, 2012, pp. 46-71.

Victor Y. Lee et al., "Nanogel Star Polymer Architectures: A Nanoparticle Platform for Modular Programmable Macromolecular Self-Assemby, Intercelluar Transport, and Dual-Mode Cargo Delivery," Advanced Materials, D Sep. 8, 2011, 4509-4515.

Prosecution History from U.S. Appl. No. 14/788,405, dated Sep. 6, 2017 through May 25, 2018, 30 pp.

List of Patents treated as related, Appendix P, 2 pgs, Filed Sep. 18, 2018.

* cited by examiner

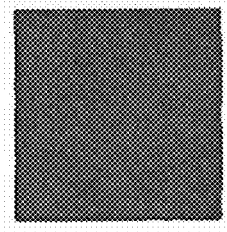
FIG. 6A
Unmodified RO
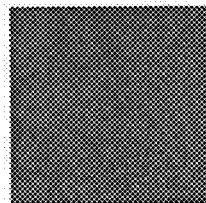
FIG. 6B
SP1 (100amine)
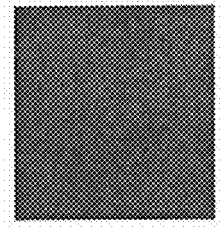
FIG. 6C
SP2 (55Amine/45PEG)
FIG. 6D
SP2 (27Amine/73PEG)
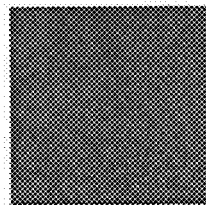
FIG. 6E
PEG (100PEG)

ANTIFOULING AND ANTIMICROBIAL COATINGS FOR THIN FILM COMPOSITE MEMBRANES

This application is a divisional of U.S. application Ser. No. 14/788,405, filed Jun. 30, 2015, which is incorporated herein by reference in its entirety.

BACKGROUND

Membrane filtration technology has been widely used for liquid purification. Polyamide thin-film composite (TFC) membranes efficiently remove small particles and ions, and have been used for water desalination processes, such as nanofiltration (NF) and reverse osmosis (RO).

Fouling can become a problem in membrane filtration processes, even if the feed liquid is pre-treated to remove potential foulants. Fouling is a process that results in a decrease in performance of a membrane, caused by the deposition of suspended or dissolved solids on the external membrane surface, on the membrane pores, or within the membrane pores. To reduce fouling, the surface of the membrane may be chemically cleaned, or the system may be flushed periodically to remove foulants on the membrane surface.

Two principal types of fouling deteriorate membrane performance over time. Organic fouling can be caused by natural organic matters (NOMs) that accumulate on the surface of the filtration membrane, form a thick cake layer, and even block the internal pores of the membrane. Organic fouling can cause severe flux decline and shorten the useful life of filtration membranes. Biofouling caused by bacteria in the feed water can also compromise membrane performance. Bacteria cells can adhere to the membrane surface and form a thick biofilm on the surface that is very difficult to remove.

To effectively maintain membrane performance for extended periods of time, membrane coatings with both antifouling (AF) and antimicrobial (AM) functions are needed.

SUMMARY

In one aspect, the present disclosure is directed to a coated, thin-film composite membrane that includes a porous support and a polyamide barrier layer in contact with the porous support. A fouling-resistant and antimicrobial layer of star polymers is in contact with the polyamide barrier layer. The star polymers included hydrophilic arms of about 40 mol % to about 80 mol % of neutral hydrophilic moieties, and about 60 mol % to about 20 mol % of antimicrobial functional groups.

In another aspect, the present disclosure is directed to a method of forming a layer of self-assembled star polymers on a thin-film composite membrane. The method includes exposing a surface of a polyamide barrier layer of the thin-film composite membrane to an aqueous solution including star polymers with hydrophilic arms comprising about 40 mol % to about 80 mol % of polyethylene glycol (meth)acrylates, and about 60 mol % to about 20 mol % of amino-functional (meth)acrylates. The method further includes draining the excess star polymer solution to form an antifouling and antimicrobial coating on the polyamide barrier layer.

In yet another aspect, the present disclosure is directed to a thin film composite filtration membrane including a polyamide barrier layer on a porous support, and a coating on a surface of the polyamide barrier layer. The coating includes a microgel core and at least 6 hydrophilic polymer arms including about 40 mol % to about 80 mol % of polyethylene glycol (meth)acrylates, and about 60 mol % to about 20 mol % of amino-functional (meth)acrylates.

The coating compositions of the present disclosure have both antifouling moieties and antimicrobial moieties, and can be applied on a TFC membrane to form an ultra-thin coating, which in some embodiments is a monolayer. In addition, the coating compositions can be applied to the TFC membrane using a simple surface-coating technique in an aqueous environment, so the original permeability of the TFC membrane is substantially maintained.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6A-6E is a series of photographs showing bacterial growth tests of different membranes before and after the application of star polymer coatings.

Like symbols in the figures indicated like elements.

DETAILED DESCRIPTION

Figure 1:
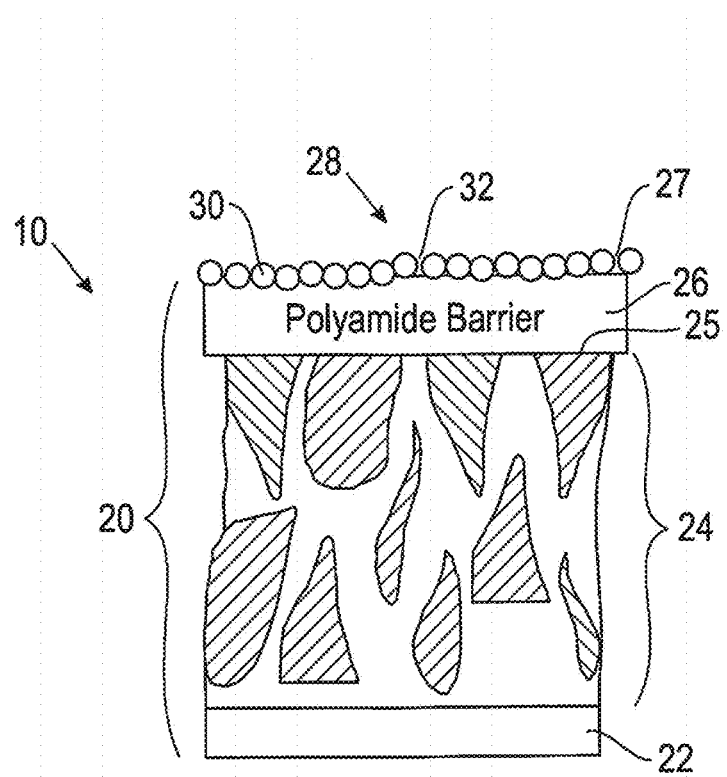
FIG. 1 is a schematic, cross-sectional view of a portion of a thin film composite (TFC) filtration membrane including an antifouling and antimicrobial layer of functionalized star polymers.

Referring to FIG. 1, a coated filtration membrane filtration membrane construction 10 includes a thin film composite (TFC) membrane 20 overlain by an antifouling and antimicrobial coating layer 28. The antifouling and antimicrobial coating layer 28 includes at least one layer of functionalized star polymers 30.

The TFC membrane 20 includes a polyamide barrier layer 26 on a major surface 25 of a porous layer 24. The porous layer 24 overlain by the polyamide barrier layer 26 can vary widely depending on the intended application, can be flexible or rigid, and can include an organic material, an inorganic material, a hybrid organic-inorganic material, a metal material, or a combination of the foregoing materials. In this application the term porous refers to materials with pores that are regular and/or irregular voids and/or channels extending from one face to an opposite face of the layer 24.

In some embodiments, an ultrafiltration (UF) membrane capable of supporting the formation of the polyamide barrier layer 26 through interfacial polymerization can be used as the porous layer 24. In various embodiments, (UF) stock membranes have an average pore size of about 2 nm (0.002 μm) to about 100 nm (0.1 μm), about 2 nm to about 30 nm, or about 5 nm to about 30 nm, or about 5 nm to about 20 nm. In various embodiments, the UF membranes have a molecular weight cut-off (MWCO) of about 10,000 Daltons to 100,000 Daltons. In this application molecular weight cut-off or MWCO refers to the lowest molecular weight solute (in Daltons) in which 90% of the solute is retained by the membrane, or the molecular weight of the molecule (e.g., a globular protein) that is 90% retained by the membrane. For example, the pore size of a poly(sulfone) (PSF) ultrafiltration stock membrane used in the examples below is about 5 nm to about 30 nm.

In various embodiments, the porous layer 24 can have a thickness of 1 μm to 10 millimeters, more particularly 1 μm to 100 μm, more particularly 1 μm to 80 μm, and even more particularly 1 μm to 50 μm.

Exemplary organic materials for the porous layer 24 include cellulose acetates, cellulose nitrates, regenerated celluloses, polysulfones, polyethersulfones, polypiperazine amides (such as those available under the trade designation FILMTEC from Dow Chemical, Midland, Mich.), polyacrylonitriles and copolymers, track-etched polyesters (e.g., those sold under the trade designation CYCLOPORE by Whatman Ltd.), polycarbonates (e.g., those sold under the trade designation NUCLEPORE by Whatman Ltd), poly (vinylidene difluoride), polypropylenes, Nylon 6,6, poly (tetrafluoroethylene)s (e.g., those sold under the trade names PORO-TEX and PARA-TEL by DeWAL Industries), and combinations of the foregoing materials.

Exemplary inorganic materials that may optionally be present in the porous layer 24 include nanoporous alumina ($Al_2O_3$) (e.g., those sold under the trade name ANOPORE by Whatman Ltd.), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials.

Exemplary metals that may be included in the porous layer 24 include, for example, nickel, nickel alloys, and stainless steel.

In some embodiments, the porous layer 24 can optionally be underlain by a support layer 22, which may be, for example, another membrane such as those described above, a woven or a non-woven fibrous material, a polymeric film or a paper layer.

In some embodiments, the porous layer 24 can optionally be reinforced by organic and/or inorganic fillers (not shown in FIG. 1), which may be, for example, polyester woven mesh, carbon nanotubes, or zeolite nanoparticles.

Referring again to FIG. 1, the polyamide barrier layer 26 on the major surface 25 of the porous layer 24 can be any layer derived from a reaction between a polyamine and an acyl halide. In some embodiments, the polyamide barrier layer 26 is formed from an interfacial polymerization reaction on a porous support layer between an aqueous chemical mixture including a monomeric polyamine reactant and an organic chemical mixture including a monomeric polyfunctional acyl halide, although these reactants can be reacted in any order. The aqueous chemical mixture and the organic chemical mixture are immiscible with each other, and when the chemical mixtures are placed in contact, an interface forms where the interfacial polymerization reaction takes place. The aqueous and organic chemical mixtures can independently be solutions, dispersions, or combinations thereof. Preferably, the aqueous and organic chemical mixtures are both solutions, and will be referred to in the discussion that follows as solutions.

The aqueous chemical mixture used to interfacially form the polyamide barrier layer 26 includes a monomeric polyamine reactant represented by Formula 1:

$R(NH_2)_z$               Formula 1 wherein R represents an organic group selected from aliphatic, alicyclic, aromatic, heterocyclic groups and combinations thereof, and z represents an integer of 2 or more, 2 to 20, or 2 to 8. In this application, the recitations of numerical ranges by endpoints include all numbers subsumed within that range (e.g., 1 to 5 includes 1, 1.5, 2, 2.75, 3, 3.80, 4, 5, etc.). In some embodiments, R includes an aromatic group, and more preferably consists of one or more aromatic groups.

In some embodiments, R in the monomeric polyamine reactant of Formula 1 represents an organic group with 2 to 30 carbon atoms, or 2 to 20 carbon atoms, or 6 to 20 carbon atoms. For example, R can include an aromatic organic group selected from benzene rings, naphthalene rings, cyclohexane rings, admanthane rings, norbornane rings and combinations thereof. In some embodiments, R in Formula 1 is a benzene ring, and z is equal to 2.

In another embodiment, the aqueous chemical mixture used to interfacially form the polyamide barrier layer 26 includes a monomeric polyamine reactant having one or more hexafluoroalcohol groups as represented by Formula 1A:

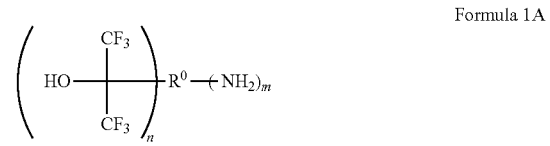

Formula 1A wherein $R^0$ represents an organic group selected from the group consisting of aliphatic, alicyclic, aromatic, heterocyclic groups and combinations thereof, m is an integer of 2 or more, 2 to 20, or 2 to 8, and n is an integer of 1 or more, 1 to 20, or 1 to 8.

In various embodiments, R and $R^0$ in the monomeric polyamine reactants of Formulas 1 and 1A above represent an organic group with 2 to 30 carbon atoms, or 2 to 20 carbon atoms, or 6 to 20 carbon atoms. For example, $R^0$ can include an aromatic organic group selected from benzene rings, naphthalene rings, cyclohexane rings, admanthane rings, norbornane rings and combinations thereof.

In one embodiment, in the monomeric polyamine reactant used to form the polyamide barrier layer 26, $R^0$ can be an organic group represented by Formula 3:

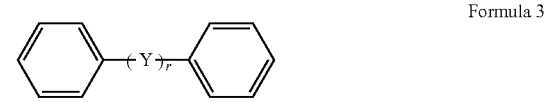

Formula 3 wherein Y represents an organic group selected from $CH_2$, O, S, C=O, $SO_2$, $C(CH_3)_2$, $C(CF_3)_2$ and combinations thereof, and r represents an integer of 0 or 1. In Formula 3, a monovalent amino ($NH_2$) and a monovalent hexafluoroalkyl [$C(CF_3)_2OH$] group are each chemically bonded to the benzene rings.

In another embodiment, in the monomeric polyamine reactant of Formulas 1 and 2, R or R° can be an organic group represented by Formula 4:

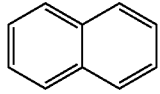

Formula 4 wherein a monovalent amino (NH$_2$) and a monovalent hexafluoroalkyl [C(CF$_3$)$_2$OH] group are each chemically bonded to the naphthalene rings.

In another embodiment, the monomeric polyamine reactant in the aqueous solution used to form the polyamide barrier layer 26 includes at least one of a compound selected from a tetravalent organic compound represented by Formula 6 or a trivalent organic compound represented by Formula 7:

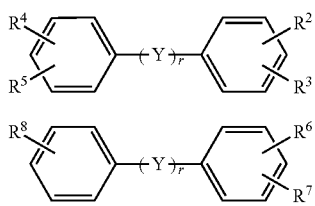

Formula 6

Formula 7 where R$^2$, R$^3$, R$^4$, R$^5$, R$^6$, R$^7$ and R$^8$ are each independently selected from NH$_2$ and C(CF$_3$)$_2$OH. Y represents an organic group selected from CH$_2$, O, S, C=O, SO$_2$, C(CH$_3$)$_2$, C(CF$_3$)$_2$ and combinations thereof, and r represents an integer of 0 or 1.

In yet another embodiment, the monomeric polyamine reactant in the aqueous solution used to form the polyamide barrier layer 26 includes at least one of a compound selected from a tetravalent organic compound represented by Formula 8 or a trivalent organic compound represented by Formula 9:

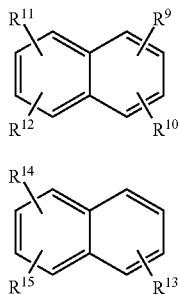

Formula 8

Formula 9 wherein R$^9$, R$^{10}$, R$^{11}$, R$^{12}$, R$^{13}$, R$^{14}$ and R$^{15}$ are each independently selected from NH$_2$ and C(CF$_3$)$_2$OH.

In another embodiment, the monomeric polyamine reactant in the aqueous solution used to form the polyamide barrier layer 26 includes at least one of a compound selected from a trivalent organic compound represented by Formula 10 or a tetravalent organic compound represented by Formula 11:

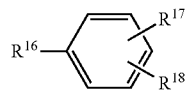

Formula 10

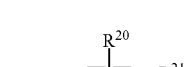

Formula 11 wherein R$^{16}$, R$^{17}$, R$^{18}$, R$^{19}$, R$^{20}$, R$^{21}$ and R$^{22}$ are each independently selected from NH$_2$ and C(CF$_3$)$_2$OH.

In other embodiments, the monomeric polyamine reactant in the aqueous solution used to form the polyamide barrier layer 26 is represented by any of the Formulas 15 through 36, or combinations thereof:

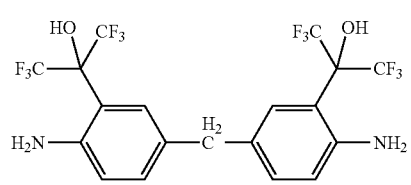

Formula 15

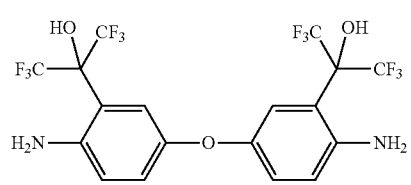

Formula 16

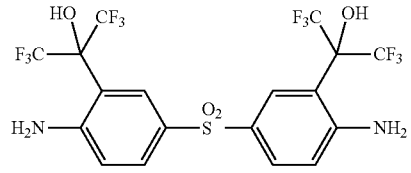

Formula 17

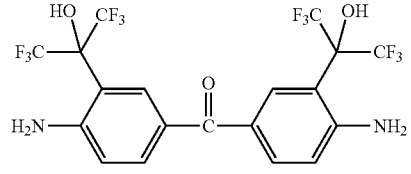

Formula 18

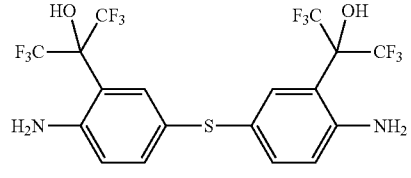

Formula 19

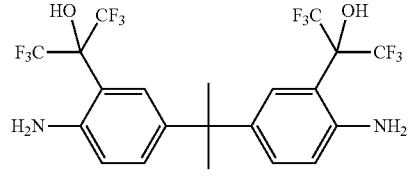

Formula 20

Formula 21
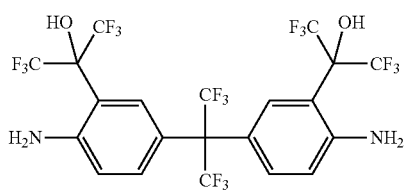
Formula 22
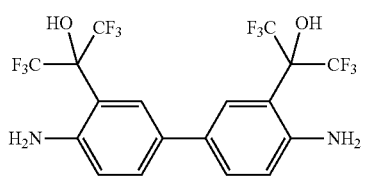
Formula 23
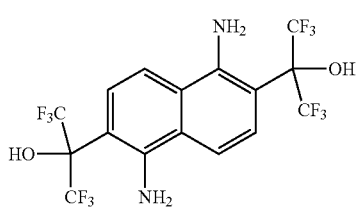
Formula 24
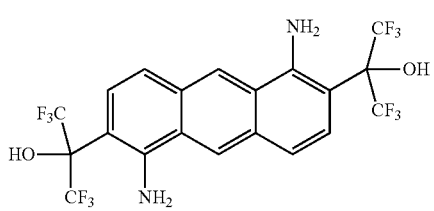
Formula 25
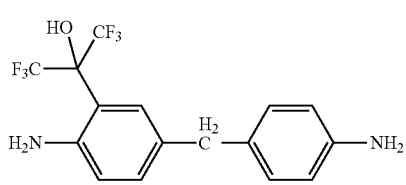
Formula 26
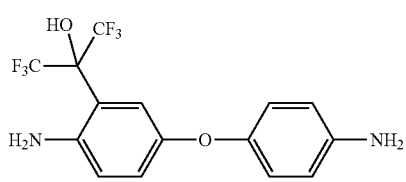
Formula 27
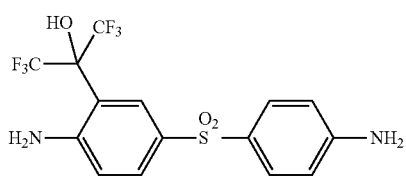
Formula 28
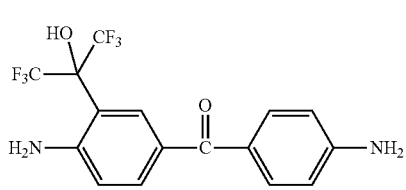
Formula 29
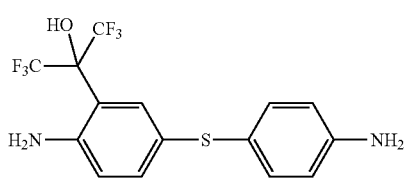
Formula 30
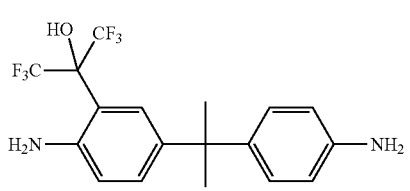
Formula 31
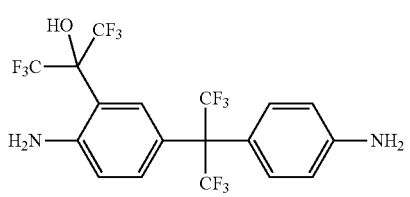
Formula 32
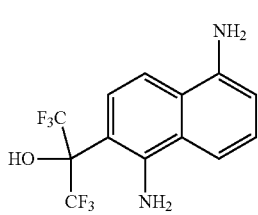
Formula 33
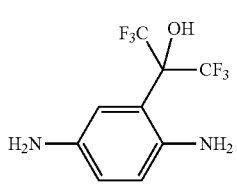
Formula 34
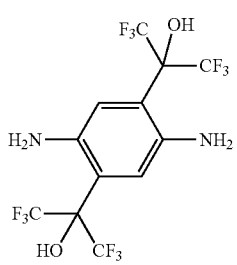
Formula 35
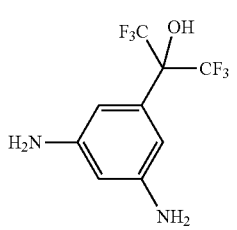

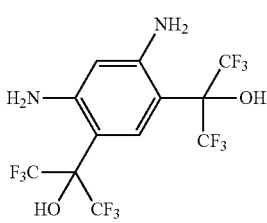

Formula 36

A base can be optionally added to aqueous solution to improve the solubility of the monomeric polyamine reactants of Formulas 1 and 1A. The base used in the aqueous solution may vary widely, and can include an organic base, an inorganic base, and combinations thereof. For example, the base in solution can include inorganic hydroxides, organic hydroxides, carbonates, bicarbonates, sulfides, amines and combinations thereof. Suitable bases include, but are not limited to, NaOH, KOH, Ca(OH)$_2$, Na$_2$CO$_3$, K$_2$CO$_3$, CaCO$_3$, NaHCO$_3$, KHCO$_3$, triethyl amine, pyridine, tetramethylammonium hydroxide and combinations thereof.

In other embodiments, other reactive amine monomers suitable for interfacial polymerization of TFC membranes such as, for example, substituted or unsubstituted piperazine or polyethyleneimine, and combinations thereof, could be used.

The organic chemical mixture includes a monomeric polyfunctional acyl halide reactant, represented by the Formula 2:

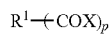

Formula 2 wherein $R^1$ represents an organic group selected from aliphatic, alicyclic, aromatic, heterocyclic groups and combinations thereof, X is a halide selected from fluorine, chlorine, bromine and iodine, and p represents an integer of 2 or more, 2 to 20, or 2 to 8.

In some embodiments, $R^1$ in the polyfunctional acyl halide reactant of Formula 2 represents an organic group with 1 to 30 carbon atoms, or 1 to 20 carbon atoms, or 1 to 15 carbon atoms. In some embodiments, in the polyfunctional acyl halide reactant of Formula 2, $R^1$ can include an organic group selected from benzene rings, naphthalene rings, cyclohexane rings, admanthane rings, norbornane rings and combinations thereof.

In some embodiments, $R^1$ in the polyfunctional acyl halide reactant of Formula 2 represents an organic group represented by Formula 12,

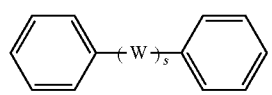

Formula 12 wherein W represents an organic group selected from CH$_2$, O, S, C=O, SO$_2$, C(CH$_3$)$_2$, C(CF$_3$)$_2$ and combinations thereof, s represents an integer of 0 or 1, and monovalent COX is chemically bonded to the benzene rings, wherein X is independently selected from fluorine, chlorine, bromine and iodine.

In some embodiments, the monomeric polyfunctional acyl halide reactant in the organic solution used to form the polyamide barrier layer 26 includes at least one of a divalent organic compound represented by Formula 13 or a trivalent organic compound represented by Formula 14:

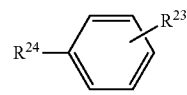

Formula 13

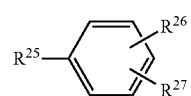

Formula 14 wherein $R^{23}$, $R^{24}$, $R^{25}$, $R^{26}$ and $R^{27}$ are each independently selected from monovalent COX, wherein X is independently selected from fluorine, chlorine, bromine and iodine.

In other embodiments, the monomeric polyfunctional acyl halide reactant in the organic solution used to form the polyamide barrier layer 26 includes at least one of a compound selected from a trivalent organic compound represented by Formula 13A or a divalent organic compound represented by Formula 14A:

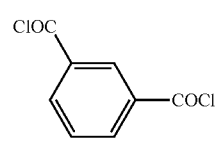

Formula 13A

Formula 14A wherein $R^{28}$, $R^{29}$, $R^{30}$, $R^{31}$ and $R^{32}$ are each independently selected from monovalent COX, and X is independently selected from fluorine, chlorine, bromine and iodine, wherein W represents an organic group selected from CH$_2$, O, S, C=O, SO$_2$, C(CH$_3$)$_2$, C(CF$_3$)$_2$ and combinations thereof, and wherein s represents an integer of 0 or 1.

In other embodiments, the monomeric polyfunctional acyl halide reactant in the organic solution used to form the polyamide barrier layer 26 includes a compound selected from any of the compounds in Formulas 37 through 61, and combinations thereof:

Formula 37

Formula 38

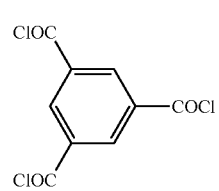

Formula 39

-continued

Formula 40
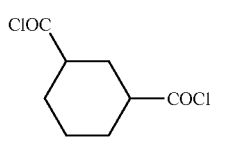

Formula 41
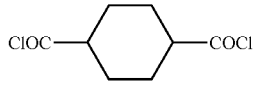

Formula 42
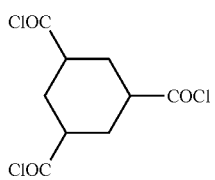

Formula 43
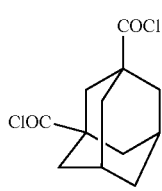

Formula 44
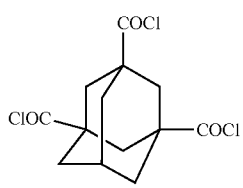

Formula 45
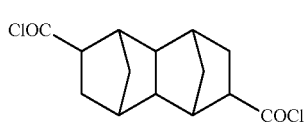

Formula 46
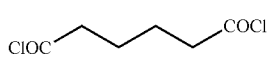

Formula 47
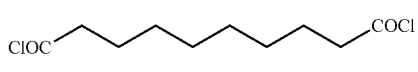

Formula 48
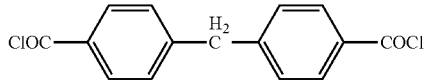

Formula 49
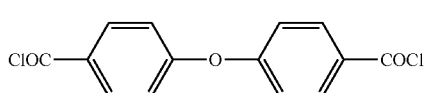

Formula 48
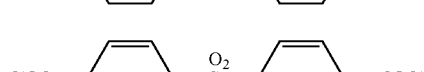

Formula 50
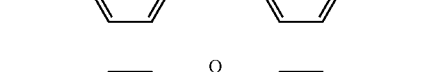

Formula 51

-continued

Formula 52
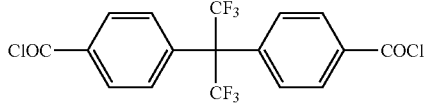

Formula 53
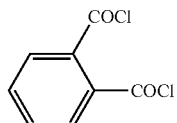

Formula 54
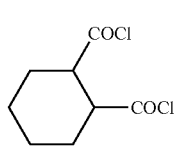

Formula 55
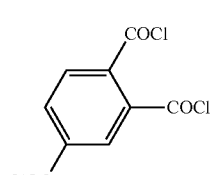

Formula 56
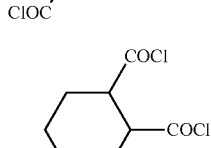

Formula 57

Formula 58
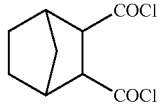

Formula 59
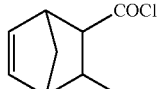

Formula 60
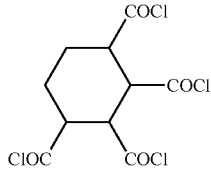

Formula 61
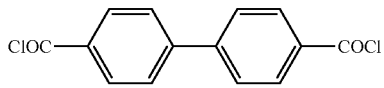

The organic solvent used in the organic solution used to form the polyamide barrier layer 26 may vary widely, and can include organic compounds with 1 to 20 carbon atoms, or 1 to 16 carbon atoms, or 1 to 12 carbon atoms. Suitable organic solvents include, but are not limited to, n-hexane, n-heptane, n-octane, n-decane, n-dodecane, carbon tetrachloride, chloroform, dichloromethane, chlorobenzene, xylene, toluene, benzene and combinations thereof.

Optionally, a phase transfer catalyst or surfactant or other additives can be added to at least one of the aqueous solution or the organic solution to enhance reactivity or to improve the performance of the polyamide barrier layer 26.

The concentration of the monomeric polyamine reactants in the aqueous solution or the acyl halide reactants in the organic solution can vary widely. For example, the concentration of the monomeric polyamine reactants in the aqueous solution can range from 0.01% (w/v) to 20% (w/v), or 0.5% to 10% (w/v), or 1% to 5%. Similarly, the concentration of the acryl halide reactants in the organic solution can range from 0.01% (w/v) to 10% (w/v), or 0.05% to 5% (w/v), or 0.1% to 2%.

The functional groups on the monomeric reactants are selected to provide a crosslinked polymeric reaction product to form the polyamide barrier layer 26. For example, diamine monomers will always make a crosslinked polyamide by reacting with trimesoyl chloride (TMC). After the interfacially polymerized, crosslinked aromatic polyamide has been formed, its crosslink density can optionally be further increased by post-polymerization reactions with crosslinking or molecular weight-increasing agents such as methane sulfonyl halides, epihalohydrins, trimethylamine-sulfur trioxide complex, formaldehyde, glyoxal, and the like.

In some embodiments, the polyamide barrier layer 26 can be made to include multiple, chemically distinct crosslinked sub-layers such as described in U.S. Publication No. 2013/0327714, which is incorporated by reference herein in its entirety. For example, in one embodiment an aqueous solution of Formula 1 above is reacted with an organic solution of Formula 2 above to form a first polyamide sub-layer, and then the first polyamide layer is further reacted with a compound of Formula 1A above to form a second copolyamide sub-layer on the first polyamide sub-layer. The first polyamide sub-layer and the second copolyamide sub-layer are crosslinked with one another.

The antifouling and antimicrobial coating 28 on the major surface 27 of the polyamide barrier layer 26 of the TFC membrane 20 includes functionalized star polymers 30 with a central core and a plurality of hydrophilic arms on the core. In some embodiments, the central core could be hydrophobic to enhance film durability in an aqueous media. In this disclosure the term "star polymer" refers to any branched polymer including a plurality of linear polymer arms (at least six) attached at a central core. The Matyjaszewski group at Carnegie Mellon University provides general information regarding the structure and synthesis of various star copolymers at a site given by the concatenation of "cmu.edu" and "maty/materials/Polymers_with_specific_Architecture/star-copolymers.html."

In this disclosure the term hydrophobic refers to materials that are antagonistic to water or incapable of dissolving in water, while the term hydrophilic refers to materials that have a tendency to bind to or absorb water.

Referring again to FIG. 1, the coating 28 may be continuous or discontinuous, and may overlie all or a portion of the surface 26 of the porous layer 24. As shown in FIG. 1, in some embodiments the coating 28 includes some small gaps or pores 32. In some embodiments, the coating 28 can extend into any defective pores of the polyamide barrier layer 26.

The coating 28 includes at least one layer of functionalized star polymers 30 (FIG. 1). In various embodiments, the thickness of the coating 28 is about 0.5 nm to about 20 nm.

The central core of the star polymers 30 making up the coating 28 can be an atom, molecule, or macromolecule, or a globular microgel (i.e., a cross-linked polymer gel of microscale proportions) and in some embodiments the core itself may be multifunctional. In various embodiments, the core contains aromatic, aliphatic, or mixed substituents with carbon only or mixtures containing heteroatoms. In some embodiments, the core is crosslinked and contains a plethora of surface functionality. In some embodiments, the core retains its shape by covalent crosslinking, although it could also be held together by electrostatic, hydrogen bonding, pi-stacking, or metal-ligand interactions.

In various embodiments the core of the star polymers 30 making up the coating 28 includes a hydrophobic polymer, and suitable examples include, but are not limited to, polyolefins, polystyrene (PS), poly(alkylmethacrylate), polyacrylamide, polycarbonate and polyester.

The chains, or "arms," of the star polymers 30 making up the coating 28 include variable-length organic chains, which can be made of similar or different monomers. The arms can be chemically identical (homostars) or different (heterostars or miktoarm stars). In other embodiments, the arms may include multiple monomers or polymers, resulting in star-block polymers or random star copolymers. In various embodiments, the star polymers include at least 6, or at least 10, or at least 20, or at least 30, or at least 60, arms covalently attached to the core.

In various embodiments, the hydrophilic arms are composed of neutral hydrophilic polyethylene glycol moieties to provide the coating 28 with antifouling functionality. In addition, the hydrophilic arms include quaternary ammonium-functionalized species with positive charges, independent of pH, and/or amine-functionalized species, which can form positively-charged ammonium moieties under neutral pH conditions or in the presence of acidic compounds to provide the coating 28 with antimicrobial functionality. In various embodiments, the hydrophilically-functionalized arms of the star polymers include (meth)acryl functionality, wherein (meth)acryl includes acrylates and methacrylates. Suitable (meth)acryl functional groups for the star polymer arms include, but are not limited to, polyethylene glycol (PEG) (meth)acrylates such as polyethylene glycol methacrylate (PEGMA), and amino-functional (meth)acrylates such as dimethylaminoethyl methacrylate (DMAEMA), and combinations thereof. In one embodiment, PEGMA provides the coating 28 with an antifouling function, and DMAEMA provides the coating 28 with an antimicrobial function.

In one non-limiting embodiment, a suitable star polymer for the antifouling and antimicrobial coating 28 is shown in Formula 62 below:

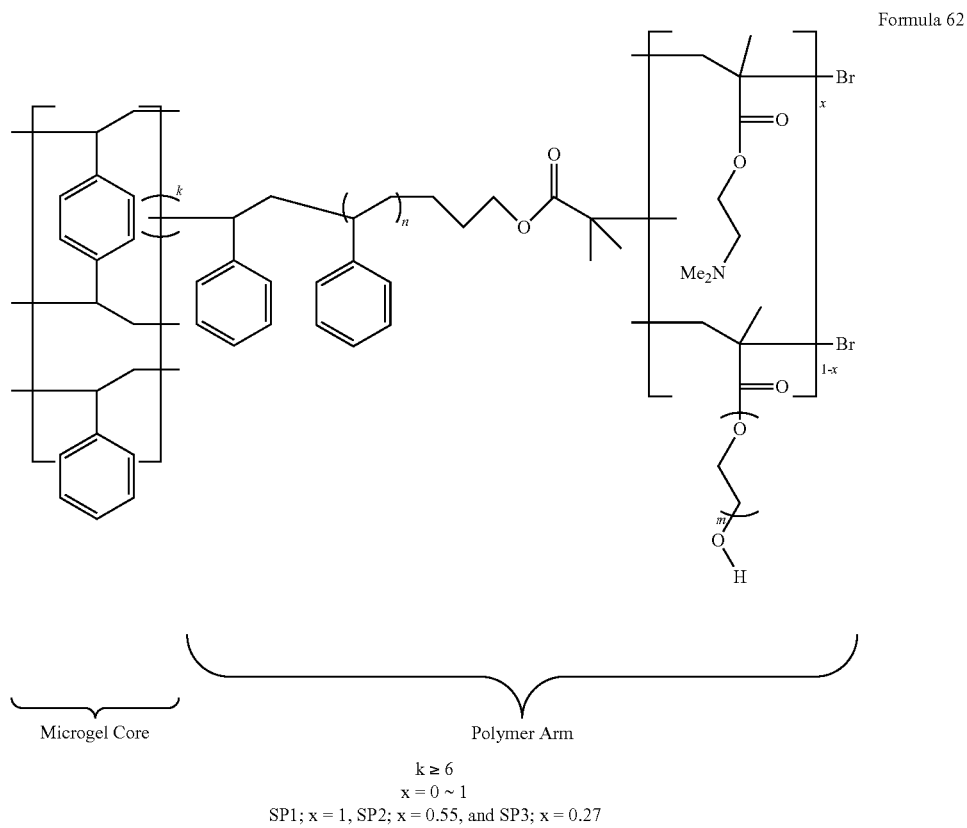

Formula 62

Microgel Core     Polymer Arm k ≥ 6
x = 0 ~ 1
SP1; x = 1, SP2; x = 0.55, and SP3; x = 0.27

In Formula 62, k is an integer greater than or equal to about 6, n is an integer greater than about 10, m is an integer greater than 1, and x ranges from 0.2 to 0.6. In Formula 62, the star polymer includes a hydrophobic polymeric globular microgel polystyrene (PS) core with aromatic monomeric units and an arrangement of 6 or more, 10 or more, 20 or more, 30 or more, or 60 or more, polymeric arms attached to the microgel core.

As noted in Formula 62, a linking portion of the polymeric arms attached to the microgel core is formed from n units of homopolymers or random copolymers with monomeric units including alkyl, cycloalkyl, alkoxy, and combinations thereof, wherein n is greater than about 10, or about 20, or about 30, or about 50, or about 60.

In various embodiments, the functional region of the star polymer of Formula 62 can include dimethylaminoethyl (meth)acrylates (DMAEMA) containing monomers in an amount from about 20 mol % to about 60 mol %, or from about 27 mol % to about 55 mol %, and PEGMA-containing monomers in an amount from about 40 mol % to about 80 mol %, or from about 45 mol % to about 73 mol %. In one example embodiment, the functional region of the star polymer of Formula 62 includes 55 mol % of DMAEMA containing monomers and 45 mol % of PEGMA-containing monomers. In another example embodiment, the functional region of the star polymer of Formula 62 includes 27 mol % DMAEMA-containing monomers and 73 mol % PEGMA-containing monomers.

Star-shaped polymers can be synthesized through various approaches. The most common syntheses include an arm-first approach, in which the living chains are used as the initiators, and a core-first approach, in which the core is used as the initiator. Other synthetic routes include: controlled sol-gel processes, group transfer polymerization, transition metal catalysis, living anionic polymerization, living cationic polymerization, ring opening polymerization, ring-opening metathesis polymerization (ROMP), atom transfer radical polymerization (ATRP), reversible addition-fragmentation chain transfer polymerization (RAFT) and nitroxide mediated radical polymerization.

The hydrophilic arms include neutral hydrophilic polyethylene glycol moieties (for example, poly(ethylene glycol) monomethyl ether methacylate (PEGMA)) for antifouling functionality and amine-functionalized species, which eventually form positively-charged ammonium species under neutral pH conditions or in the presence of acidic compounds (for example, 2-(dimethylamino)ethyl methacrylate (DMAEMA)), for antimicrobial functionality. The functionalized star polymers can be assembled on the surface 27 of the polyamide barrier layer 26 through the interaction between the negatively-charged surface 27 and the positively-charged ammonium moieties on the arms of the star polymer, which forms a polymer coating 28 with good chemical and physical stability (FIG. 1).

In some embodiments, the cores and the arms of the star polymers can be selected so that the star polymers "self-assemble" on the negatively-charged surface 27 of the polyamide layer 26 to form the coating 28, which is a monolayer of star polymers. In this application the term "self-assemble" means the star polymers align with one another in an organized structure or pattern of building blocks. The interactions between the cores and arms of the star polymers, which can be, for example, the result of any of van der Waals attraction, electrostatic charge interaction or electronic (e.g., charge transfer) interaction, hydrogen bonding or metal-ligand interaction, cause the star polymers to align with one another on the surface 27 of the polyamide barrier layer 26 to form the star polymer monolayer coating 28. In some embodiments, the star polymers lie down adjacent to one another without external direction to form the monolayer coating 28.

While not wishing to be bound by any theory, presently available evidence indicates that the electrostatic interaction between the negatively-charged membrane surface 27 and the positively-charged ammonium moieties on the arms of the star polymer drives the self-assembly behavior of the star polymers on the surface 27 of the polyamide barrier layer 26. The multiplicity of hydrophilic arms on the star polymers modify the surface wetting behavior of the surface 27 of the polyamide layer 26 and the resistance to microbial formation on thereon. The antifouling and antimicrobial coating 28 effectively modifies the wettability of the surface 27 of the polyamide barrier layer 26.

In another aspect, the present disclosure is directed to a process of modifying the wettability and resistance to microbial contamination of a surface of a filtration membrane and/or the pores of a TFC filtration membrane. In this process the hydrophilicity and the resistance to microbial formation of the surfaces of the polyamide barrier layer of the TFC membrane is altered by applying to the surface of the negatively charged polyamide barrier layer a star polymer having positively-charged ammonium moieties and neutral hydrophilic moieties on the exposed arms. The hydrophilic positively charged arms drive formation of a self-assembled monolayer of the star polymer through electrostatic interaction with the negatively charged surface of the polyamide barrier layer, which changes the wettability and resistance to microbial formation of the surface of the polyamide barrier layer. The neutral hydrophilic moieties also contribute in changing the wettability of surface and provide an antifouling function repelling organic- and biomolecules from the membrane surface. In one embodiment, the process includes exposing a polyamide layer of the TFC filtration membrane to a solution including a star polymer with positively-charged ammonium moieties and neutral hydrophilic moieties on the arms of for a time sufficient to form a monolayer of star polymers on the surface of the polyamide layer and/or in the pores thereof.

In various embodiments, the star polymer solution can include any solvent that is compatible with TFC filtration membrane materials, and water and alcohols have been found to be suitable. In various embodiments, the solvent in the star polymer solution is aqueous, or water. In various embodiments, the star polymer is present in the star polymer solution at a concentration of about 0.01 wt % to about 10 wt %, about 0.1 wt % to about 5 wt %, about 0.1 wt % to about 1 wt %, or about 0.1 wt % to about 0.5 wt %.

In various embodiments, the TFC membrane is exposed to the aqueous solution of the star polymer with hydrophilic arms containing both positively charged antimicrobial moieties and neutral hydrophilic moieties for about 1 minute to about 5 hours. Following exposure to the aqueous star polymer solution, the treated TFC filtration membrane may optionally be drained to remove excess star polymer solution.

In some embodiments, the treated TFC filtration membrane may optionally be dried by heating in an oven or by exposure to ambient or heated air.

In various embodiments, the TFC filtration membrane may optionally be rinsed with a solvent prior to or after the draining step, and suitable solvents include water, particularly deionized water.

The resulting TFC membrane with the antifouling and antimicrobial coating may then be incorporated into any suitable filtration apparatus for use in, for example, seawater desalination, wastewater treatment, emergency relief, or and power generation.

Various aspects of the present invention will now be demonstrated with reference to the following non-limiting examples.

EXAMPLES

Figure 2:
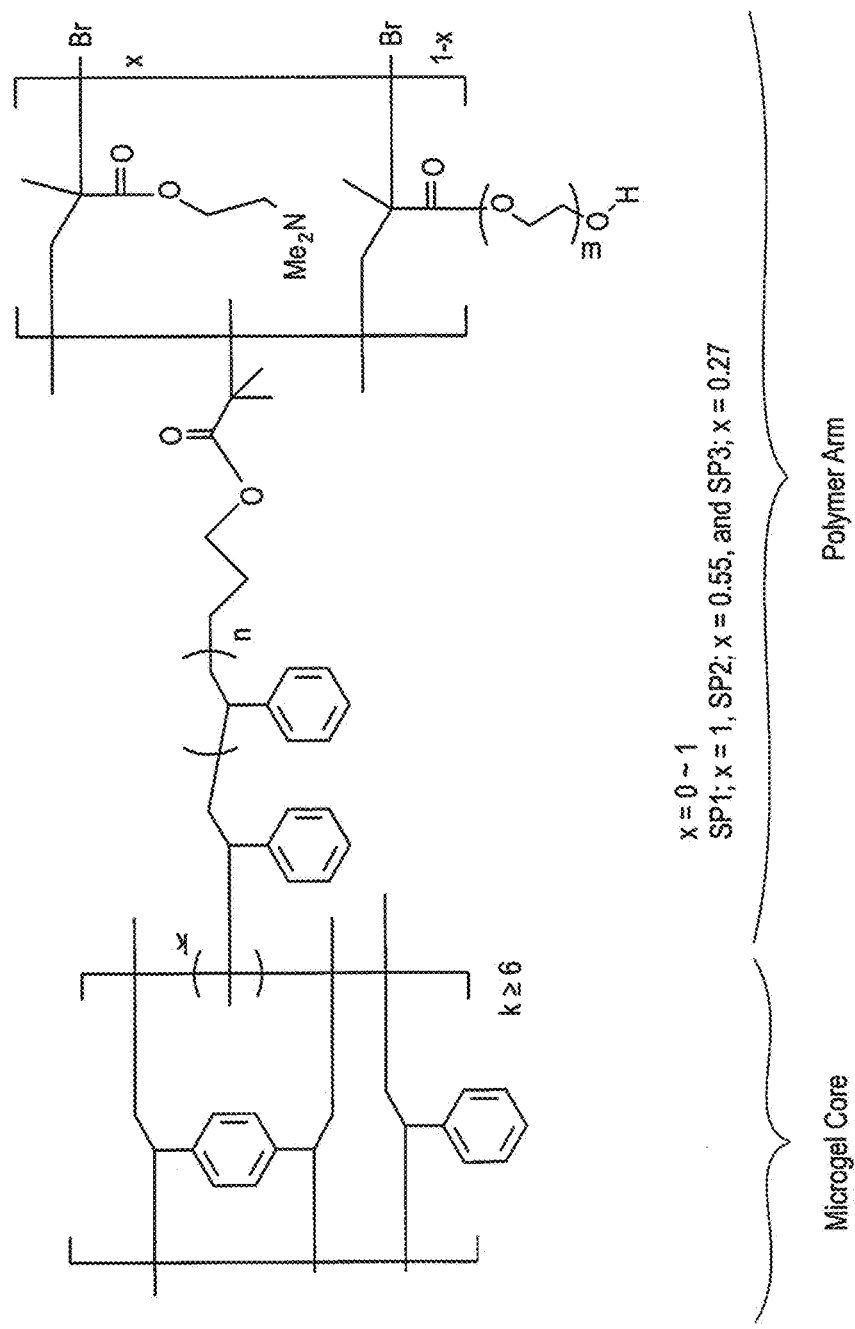
FIG. 2 is a general chemical formula for the star polymers used in the working examples of this application, which included a polystyrene (PS) core and arms of poly(ethylene glycol) monomethyl ether methacylate (PEGMA) for antifouling functionality and amine-functionalized species of 2-(dimethylamino)ethyl methacrylate (DMAEMA) for antimicrobial functionality.
Figure 3A:
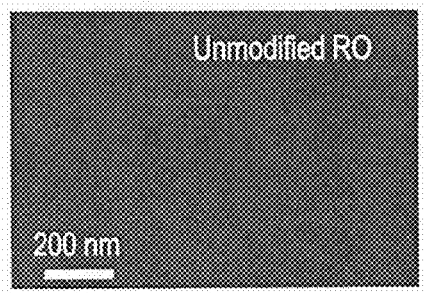
FIGS. 3A-3D show scanning electron microscope (SEM) images of TFC RO membranes before and after application of the three types of star polymer coating in Example 1.
Figure 3B:
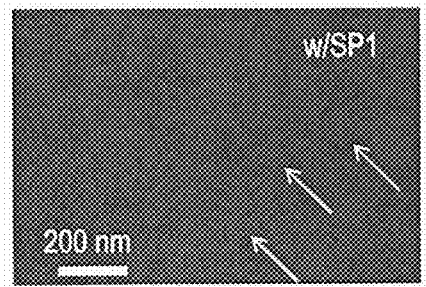
Figure 3C:
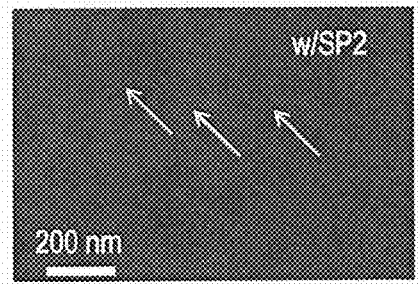
Figure 3D:
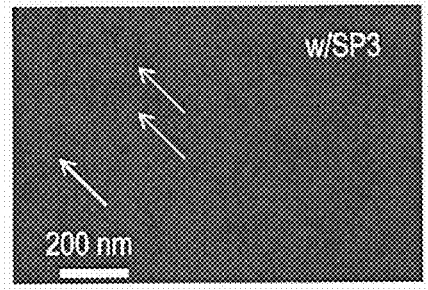

The star polymers with the general formula of FIG. 2 were synthesized as described in U.S. Patent Publication No. 2011/0243848, which is incorporated by reference in its entirety. The ratio of the arm composition was easily controlled during synthesis. The star polymers included a polystyrene (PS) core and arms with neutral hydrophilic polyethylene glycol moieties of poly(ethylene glycol) monomethyl ether methacylate (PEGMA) for antifouling functionality and amine-functionalized species, of 2-(dimethylamino)ethyl methacrylate (DMAEMA), for antimicrobial functionality.

The compositions of three difference star polymers are shown in Table 1 below.

The particle size and zeta potential of star-shaped block copolymer in water were characterized by dynamic light scattering test at Zetasizer Nano Z from Malvern.

In Table 1 below the star polymer SP1 had 100 mol % DMAEMA, which led to the highest chemical potential, 28.1 mV. With the decreasing mol % of DMAEMA and increasing mol % of PEGMA, the chemical potential of star polymers SP2 and SP3 decreased. The diameter of the three types of star polymers measured in a water solution by DSA was relatively similar.

TABLE 1

| No. | Composition (mol %) | | Diameter (nm) | Potential (mV) |
|-----|-----|-----|-----|-----|
|     | DMAEMA | PEGMA |     |     |
| SP1 | 100 | 0 | 56 | 28.1 |
| SP2 | 55 | 45 | 62 | 7.5 |
| SP3 | 27 | 73 | 65 | 0.2 |

Example 1: Physical Evaluation of Modified RO Membranes with Star Polymers

A 0.1 wt % star solution of the star polymers shown in FIG. 2 and Table 1 was used to form a self-assembled star polymer coating on a commercial TFC polyamide membrane.

A commercial TFC RO membrane was first soaked in DI water overnight to remove residual chemicals, washed with distilled water and then used for surface modification. The pre-wetted TFC RO membrane was placed inside a frame to allow coating of only the top surface of polyamide active layer, and 0.1 wt % star polymer solution in water was added to the frame. After 30 min, the star polymer solution was removed and the membrane was gently rinsed with distilled water. After the membrane surface was dried with compressed air, the membranes were kept in distilled water until performance evaluation.

The modified membranes were characterized by X-ray photoelectron spectroscopy (XPS) to analyze the elements on the membrane surface, by a streaming potential analyzer (Anton Parr SurPass) to examine the surface charge, and by scanning electron microscopy (SEM, a LEO 1550 VP FE-SEM) to detect the surface morphology.

The results in Table 2 show that star polymer coating changed the amount of oxygen, carbon and nitrogen on the TFC RO membrane surfaces. The membranes coated with SP2 and SP3 possess more oxygen and less nitrogen than unmodified membranes, since SP2 and SP3 have more PEG arms, which have more oxygen and less nitrogen. The surface potential testing of the modified membranes revealed a clear correlation that more amine arms from the star polymer will make the modified TFC RO membranes less negative than the original ones. These tests showed the formation of a star polymer coating.

Table 2 below shows an elemental analysis and surface potential of polyamide TFC RO membranes before and after application of three types of star polymer coatings.

TABLE 2

| Samples | XPS | | | Surface potential at pH = 7 (mV) |
| --- | --- | --- | --- | --- |
| | C1s (%) | N1s (%) | O1s (%) | |
| Unmodified TFC RO | 72.4 | 10.7 | 16.8 | −19 |
| w/SP1 (100 Amine) | 74.2 | 10.0 | 15.5 | −5 |
| w/SP2 (55Amine/45PEG) | 72.6 | 7.2 | 20.0 | −9 |
| w/SP3 (27Amine/73PEG) | 72.3 | 6.9 | 20.8 | −11 |

FIG. 3 shows the SEM images of TFC RO membranes before and after three types of star polymer coating. As designated by the arrows in the images, the modified RO membranes are covered by a monolayer of star polymers self-assembled on the membrane surface (average star polymer particle size: about 20 nm). The star polymer coatings were uniform and single-layered, which substantially maintained the original permeability of the RO membranes.

Example 2: Evaluation of Antifouling Efficiency of Modified RO Membrane

The antifouling efficiency of polyamide RO membranes (available under the trade designation AG from General Electric Co. (GE)) before and after star polymer (SP1, SP2 and SP3) coatings was studied by using a cross-flow filtration system with three types of surfactants, including neutral, negatively charged and positively charged.

Evaluating the antifouling efficiency of RO membranes before and after application of the star polymer coating was studied by using a cross-flow filtration system with synthetic feed water including a target foulant such as a decane-water emulsion. A decane-water emulsion (1500 ppm) was made with decane (available from Sigma Aldrich, St. Louis, Mo.) and a surfactant at a ratio of 9:1 by high speed mechanical stirring. To prepare neutral, negative, and positively charged decane-water emulsions, DS-193 (from Dow Chemical, Midland, Mich.), sodium dodecyl sulfate (SDS, from Sigma Aldrich), and dodecyltrimethylammonium bromide (DTAB, from Sigma Aldrich) were used as surfactants, respectively. The crossflow filtration was conducted at 25° C. and 200 psi. Permeate flux was recorded by digital balances connected to a computer.

Figure 4:
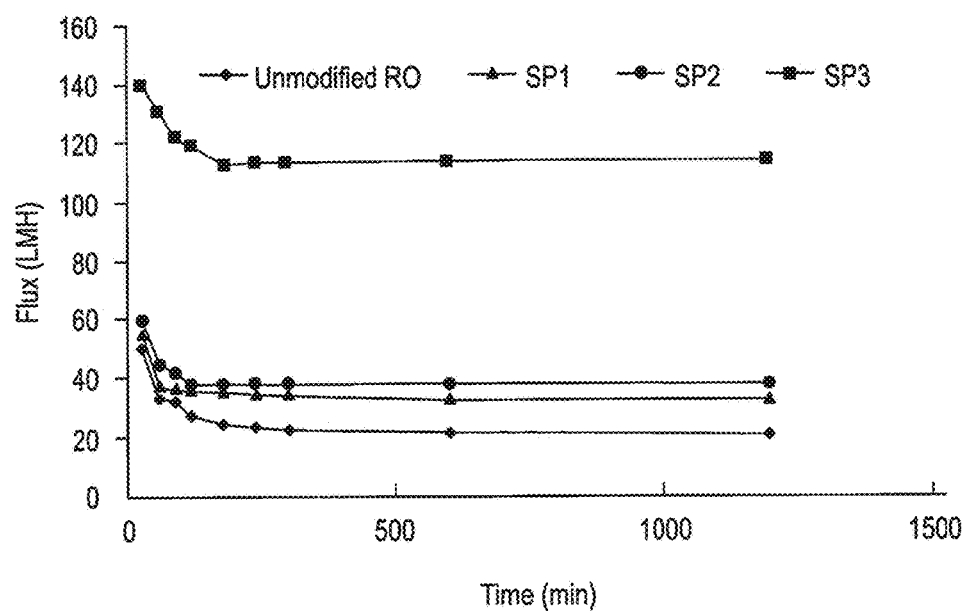
FIG. 4 is a plot of permeate flux vs. time for decane/water/DS196 emulsion cross-flow filtration tests of polyamide RO membranes, and star polymer modified RO membranes.

In the case of the neutral surfactant DS-193, the decane was emulsified with almost neutral charge in the neutral aqueous solution, so the charge interaction was limited and hydrophobic interaction dominated to induce membrane fouling. Star polymers with more PEGMA are more hydrophilic, which can weaken the hydrophobic interaction. As shown in FIG. 4, the star polymer modified-RO membranes with higher composition of hydrophilic PEGMA arms (SP3>SP2>SP1) showed a higher flux, meaning better antifouling properties, toward a neutral organic foulant.

Figure 5:
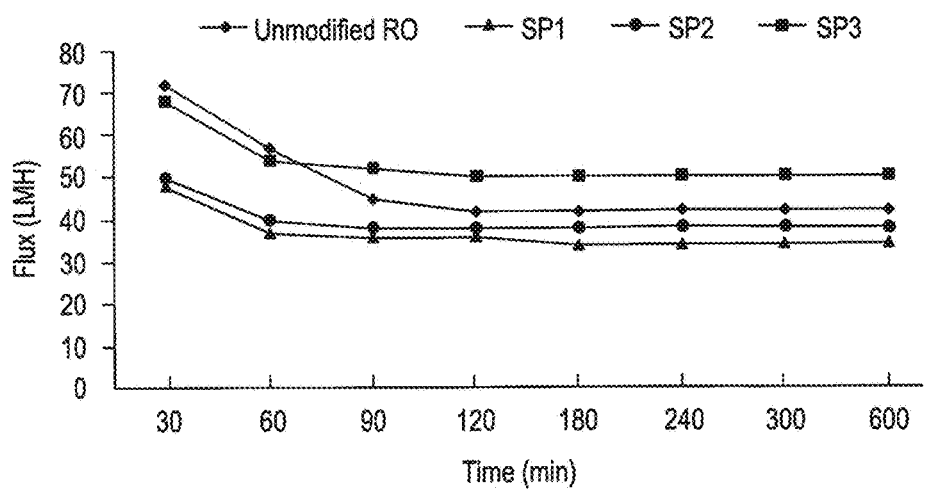
FIG. 5 is a plot of permeate flux vs. time for decane/water/SDS emulsion cross-flow filtration tests of polyamide RO membranes, and star polymer modified RO membranes.

As an anionic surfactant, SDS made the emulsified decane with a negative surface charge. In this case, both the charge and the hydrophobic interactions between foulant and membrane can contribute to membrane fouling. The star polymers with more hydrophilic PEG arms can decrease the hydrophobic interaction, while the positively-charged amine groups of the star polymer will promote charge attraction, leading to more fouling. Therefore, the balance of PEG and amine composition can be used to control membrane fouling toward the negatively charged decane-water emulsion. The results from FIG. 5 demonstrate that the star polymer coating with the highest density of hydrophilic PEG arms (SP3) showed outstanding antifouling behavior, and also that the star polymer with almost 55 wt % positively charged amine functionality (DMAEMA) and 45% PEGMA moiety (SP2) could still mitigate membrane fouling toward negatively charged surfactants when the compositions between amine and PEG were well controlled. However, the star polymer without PEG arms (SP1, 100% DMAEMA) underperformed in this test since electrostatic interaction between negatively charged decane-water emulsion and the positively charged star polymer coating was predominant.

The decane emulsion gained positive charge when the DTAB was added as a surfactant, so that all the star polymer coatings with amine functional groups repelled the emulsion efficiently from the membrane surfaces through charge repulsion, resulting in higher water flux than the unmodified RO membrane.

Example 3: Evaluation of Antimicrobial Ability of Modified RO Membrane

The antimicrobial ability of polyamide RO membranes (AG, GE) before and after the application of star polymer (SP1, SP2, SP3 and PEG) coatings prepared according to Examples 1-2 above was studied using the following bacterial growth test.

E. coli (ATCC 25922) were grown in tryptic soy broth (TSB) at 37° C. The suspension was centrifuged to form pellets at 2300 rpm for 10 minutes, and then the supernatant was removed and re-suspended in a NaCl aqueous solution (0.85%). Then, the suspension was centrifuged again, and the supernatant was removed and re-suspended in NaCl aqueous solution (0.85%). Finally, the suspension was adjusted to an optical density of approx. 0.5, and diluted 100 times for testing.

The membrane was incubated for 2 hours with approximately 5 ml of bacteria solution by exposing the membrane surface to the bacteria solution. Then, the bacteria solution was removed, and the membrane was rinsed with sterile water 3 times. The membrane was kept moist in water for 22 hours, and then the membrane surface was placed on to agar for 30 minutes to grow bacteria. The membrane was then removed, and the agar plate was placed in an incubator at 37° C. overnight. The number of colonies on the agar represented how many bacteria were still alive in the area contacted with the membrane, which demonstrated the antimicrobial efficiency of the membrane surface.

FIG. 6 shows the results from the bacterial growth test. Each white dot in the photographs represents a bacteria colony grown in the area contacted with a membrane surface, and more white dots means more bacterial growth, implying less antimicrobial ability for the membrane. The comparison of the five samples shows: (1) the star polymer coated membranes (SP1, SP2, SP3) reduced bacterial growth compared to an unmodified RO polyamide membrane; (2) the membrane coated with star polymers containing more amine groups (SP1 and SP2) had better antimicrobial abilities than the membranes coated by star polymers with less amine groups (SP3); and (3) as a comparison study, the RO membrane coated by a crosslinked PEG hydrogel with no amine groups was tested and showed the PEG hydrogel film has no measurable effect on antimicrobial activity. The results demonstrate that the star polymer coatings with a high density of positively-charged DMAEMA arms exhibited outstanding antimicrobial properties.

Summary of Antifouling and Antimicrobial Functions of Star Polymer Coated TFC RO Membranes In the combined results of the antifouling and antimicrobial tests, the modified TFC RO membranes coated by star polymers with a composition range from 27 mol % DMAEMA/73 mol % PEGMA to 55 mol % DMAEMA/45 mol % PEGMA demonstrated both antifouling and antimicrobial functionality. In comparison, the TFC RO membranes coated with SP1 or PEG did not demonstrate both antifouling and antimicrobial efficacy.

The summarized results are shown in Table 3 below.

TABLE 3

|  | Unmodified RO GE AG | Modified RO | | | |
| --- | --- | --- | --- | --- | --- |
|  |  | w/SP1 (100 Amine) | w/SP2 (55Amine/ 45PEG) | w/SP3 (27Amine/ 73PEG) | w/PEG (100PEG) |
| AntiMicrobial (AM) | control | Better (100% removal) | Better (100% removal) | Better (50% removal) | No observable AM effect |
| AntiFouling (AF) Neutral Foulant | Control | Better (60% increase) | Better (80% increase) | Better (500% increase) | N.A. |
| AntiFouling (AF) Negatively Charged Foulant | Control | Worse (20% reduction) | Comparable | Better (20% increase) | N.A. |
| AntiFouling (AF) Positively Charged Foulant | Control | Better (50% increase) | N.A. | Better (80% increase) | N.A. |

Various embodiments of the invention have been described. These and other embodiments are within the scope of the following claims.

The invention claimed is:

1. A method of forming a layer of self-assembled star polymers on a thin-film composite membrane, the method comprising:
    exposing a surface of a polyamide barrier layer of the thin-film composite membrane to an aqueous solution comprising star polymers with hydrophilic arms comprising about 40 mol % to about 80 mol % of polyethylene glycol (meth)acrylates, and about 60 mol % to about 20 mol % of amino-functional (meth)acrylates; and
    draining an excess of the aqueous solution to form an antifouling and antimicrobial coating on the polyamide barrier layer.

2. The method of claim 1, wherein the arms of the star polymers comprise about 45 mol % to about 73 mol % of the polyethylene glycol (meth)acrylates, and about 55 mol % to about 27 mol % of the amino-functional (meth)acrylates.

3. The method of claim 1, comprising drying the coating with air.

4. The method of claim 3, wherein the coating is dried for less than about 30 seconds.

5. The method of claim 1, where in the coating is further cross-linked by thermal annealing and/or UV irradiation.

6. The method of claim 1, comprising rinsing the coating with water.

7. The method of claim 1, wherein the coating comprises a monolayer of star polymers.

8. The method of claim 2, wherein the hydrophilic arms of the star polymers comprise: (i) polyethylene glycol methacrylate (PEGMA) and (ii) dimethylaminoethyl methacrylate (DMAEMA).

9. The method of claim 1, wherein the star polymers comprise a hydrophobic core.

10. The method of claim 9, wherein the hydrophobic core comprises polystyrene.

11. A method of forming a layer of self-assembled star polymers on a thin-film composite membrane with a porous support and a polyamide barrier layer in contact with the porous support, the method comprising:
    applying to the polyamide barrier layer an aqueous solution comprising star polymers with hydrophilic arms comprising about 40 mol % to about 80 mol % of polyethylene glycol (meth)acrylates, and about 60 mol % to about 20 mol % of amino-functional (meth) acrylates; wherein the star polymers self-assemble to form a coating on the polyamide barrier layer, the coating comprising a single layer of star polymers.

12. The method of claim 11, wherein the hydrophilic arms of the star polymers comprise: (i) polyethylene glycol methacrylate (PEGMA) and (ii) dimethylaminoethyl methacrylate (DMAEMA).

13. The method of claim 11, wherein the hydrophilic arms of the star polymers comprise about 45 mol % to about 73 mol % of the polyethylene glycol (meth)acrylates, and about 55 mol % to about 27 mol % of the amino-functional (meth)acrylates.

14. The method of claim 13, wherein the hydrophilic arms of the star polymers comprise: (i) polyethylene glycol methacrylate (PEGMA) and (ii) dimethylaminoethyl methacrylate (DMAEMA).

15. The method of claim 11, wherein the star polymers comprise a hydrophobic core.

16. The method of claim 15, wherein the hydrophobic core comprises polystyrene.

17. The method of claim 11, wherein the porous support comprises polysulfone (PSF).

18. The method of claim 11, wherein a support layer underlies the porous support.

* * * * *